United States Patent [19]

Bosch

[11] Patent Number: 4,649,643

[45] Date of Patent: Mar. 17, 1987

[54] APPARATUS PROVIDED WITH A HOUSING IN WHICH AN ELECTRIC MOTOR IS ACCOMMODATED

[75] Inventor: Sieds Bosch, Drachten, Netherlands

[73] Assignee: U.S. Philips Corporation, New York, N.Y.

[21] Appl. No.: 767,456

[22] Filed: Aug. 20, 1985

[30] Foreign Application Priority Data

May 23, 1985 [NL] Netherlands ............. 8501472

[51] Int. Cl.⁴ .................................. B26B 19/20
[52] U.S. Cl. ................................ 30/43; 30/436
[58] Field of Search ................... 30/43–43.92, 30/45, 26, 206, 210, 216, 228

[56] References Cited

U.S. PATENT DOCUMENTS 2,861,578 11/1958 Thompson ............... 30/26 X
3,039,188 6/1962 Somers et al. ............ 30/43.92
4,038,748 8/1977 Tyler ..................... 30/43.6

FOREIGN PATENT DOCUMENTS 725866 4/1980 U.S.S.R. .................. 30/43.6

Primary Examiner—Douglas D. Watts
Attorney, Agent, or Firm—Rolf E. Schneider

[57] ABSTRACT

An apparatus such as a dry shaver comprises a housing formed by two opposing housing sections accommodating an electric motor therewithin. A first outwardly extending mounting rim and a second outwardly extending mounting rim are provided on the electric motor, the second mounting rim being spaced from the first mounting rim. The first and second mounting rims engage the two housing sections and axially retain a part of each housing section therebetween. An axially directed edge portion is provided along the periphery of the first mounting rim and engages the two housing sections to radially retain the same therebetween.

2 Claims, 1 Drawing Figure

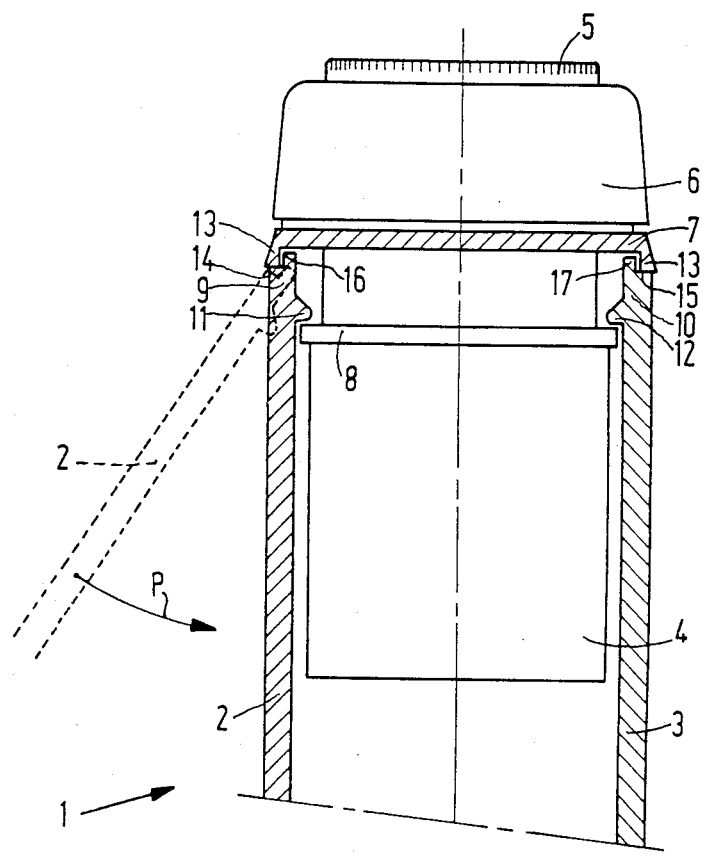

APPARATUS PROVIDED WITH A HOUSING IN WHICH AN ELECTRIC MOTOR IS ACCOMMODATED

This invention relates to an apparatus, for example a dry-shaving apparatus, provided with a housing in which an electric motor is accommodated, which housing comprises at least one housing section which is secured to the motor.

Such an apparatus is known, for example from U.S. Pat. No. 4,420,702. This known apparatus comprises two plastic housing sections and one of these sections includes hooks which engage behind the electric motor. The hooks may be integral with the housing section, but this is a construction which is unfavourable for reasons of injection-moulding technology. Alternatively, separate hooks, for example made of a metal, may be used but this means additional parts and additional assembly work during production.

The present invention aims at providing an easy-to-assemble, simple and inexpensive construction and to this end the invention is characterized in that the electric motor is provided with a first mounting rim and a second mounting rim which axially retain a part of the housing sections and the first mounting rim includes an axially directed edge portion by means of which the housing section is radially retained.

The invention will now be described in more detail with reference to the accompanying drawing, the single FIGURE of which is a partial longitudinal sectional view of a dry-shaving apparatus with parts shown in full.

The housing 1 comprises two opposing housing sections 2 and 3 and accommodates a motor 4. In a manner known per se the motor is coupled to the shaving unit 5 in the shaving head 6. The motor is provided with a first outwardly extending mounting rim 7 and a second outwardly extending mounting rim 8. The parts 9 and 10 of the housing sections 2 and 3 are axially retained between these mounting rims 7 and 8. For this purpose the parts 9 and 10 are provided with separate rims 11 and 12 respectively, which extend inwardly towards the motor and which engage the second mounting rim 8. The first mounting rim 7 is also provided along its periphery with an axially directed edge portion 13 which abuts against the rabbets 14 and 15 of the housing sections 2 and 3 and within which the end portions 16 and 17 of these housing sections are situated. In this way the parts 9 and 10 of the housing sections 2 and 3 are also retained in a radial direction. The mounting rim 8 may be an integral part of the electric motor 4. The mounting rim 7 may be a separate plastic part which is secured to the motor 4 and which is situated between the motor and the shaving head 6.

Mounting a housing section on the motor can be done very simply by the use of a snapped connection in the above construction. Housing section 2, for example, is first positioned as indicated by the broken lines, in such a way that the rabbet 14 bears against the edge portion 13. Subsequently, housing section 2 is rotated in the direction indicated by the arrow P until the rim 11 abuts against the second mounting rim 8. The elasticity of the first mounting rim 7, the part 9 and the rim 11 enables the rim 11 to be snapped behind the second mounting rim 8 into the position shown in solid lines by applying some additional force.

The two housing sections 2 and 3 may be identical and may be secured to the motor in the same way. If required, the two housing sections 2 and 3 may be secured to each other at the bottom of the apparatus by conventional means. The simple shape of the housing sections, their simple assembly and, as the case may be, the identical construction of the two housing sections enable a considerable saving in manufacturing cost to be obtained.

What is claimed is:

1. An apparatus such as a dry shaver, which comprises a housing formed by two opposing housing sections; an electric motor within the housing; a first outwardly extending mounting rim on the electric motor; a second outwardly extending mounting rim on the electric motor, said second mounting rim being spaced from said first mounting rim, said first and second mounting rims engaging the two housing sections and axially retaining a part of each housing section therebetween; and an axially extending edge portion provided along the periphery of the first mounting rim and engaging the two housing sections to radially inwardly retain the same therebetween.

2. An apparatus according to claim 1, in which the two housing sections include a separate mounting rim extending inwardly towards the motor and engaging the second mounting rim by means of a snapped connection.

* * * * *